United States Patent [19]

Gellert et al.

[11] Patent Number: 4,771,534

[45] Date of Patent: Sep. 20, 1988

[54] METHOD OF MANUFACTURE OF INJECTION MOLDING NOZZLE ELECTRICAL TERMINAL

[75] Inventors: Jobst U. Gellert, Georgetown; Denis L. Babin, Welland, both of Canada

[73] Assignee: Mold-Masters Limited, Georgetown, Canada

[21] Appl. No.: 127,771

[22] Filed: Nov. 30, 1987

[30] Foreign Application Priority Data

Oct. 16, 1987 [CA] Canada .................................. 549520

[51] Int. Cl.⁴ .............................................. H05B 3/00
[52] U.S. Cl. ......................................... 29/611; 29/879; 29/882; 29/883; 29/460; 228/179; 174/76; 425/549; 219/541; 219/543; 219/544
[58] Field of Search .......................... 29/611, 876–879, 29/882, 883, 572.2, 572.3, 460; 228/179; 174/76; 264/328.15; 338/274, 329; 425/549, 568; 219/541, 542, 543, 544; 427/103

[56] References Cited

U.S. PATENT DOCUMENTS

| | | | |
|---|---|---|---|
| 2,615,857 | 10/1952 | Clarke | 174/76 |
| 4,403,405 | 9/1983 | Gellert | 219/541 |
| 4,446,360 | 5/1984 | Gellert | 29/611 |
| 4,557,685 | 12/1985 | Gellert | 425/549 |
| 4,583,284 | 4/1986 | Gellert | 29/611 |
| 4,688,622 | 8/1987 | Gellert | 164/61 |

FOREIGN PATENT DOCUMENTS 137228 8/1947 Australia .............................. 29/876

Primary Examiner—P. W. Echols
Attorney, Agent, or Firm—Riches, McKenzie & Herbert

[57] ABSTRACT

This invention relates to a method of providing an injection molding heated nozzle with an improved electrical terminal. A plug is seated in a radial opening in the collar portion with heating element extending through it and the rear end of the heating element projecting a minimum distance from the front surface of the plug. The insulation and casing are stripped from the projecting portion and the exposed resistance wire is welded to a flat surface on a larger diameter threaded conductive stud. A sleeve having a threaded and broached inner surface is mounted over the stud with the outer end of the stud projecting beyond the outer end of the sleeve. The plug and sleeve are integrally brazed in place during the brazing step forming the rest of the nozzle. A liquid ceramic insulating material is poured to fill the space between the stud and the surrounding sleeve. A ceramic insulating washer and a steel washer are mounted on the projecting outer end of the threaded stud, before receiving the electrical lead which is held in place by a nut. The ceramic material bonds to the threads and grooves on the inner surface of the sleeve and to the stud and secures it against the applicaiton of lateral and axial forces, as well as torque and considerably reduces failure of the resistance wire.

11 Claims, 3 Drawing Sheets

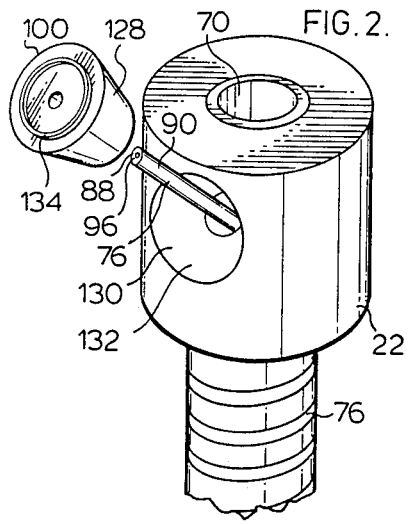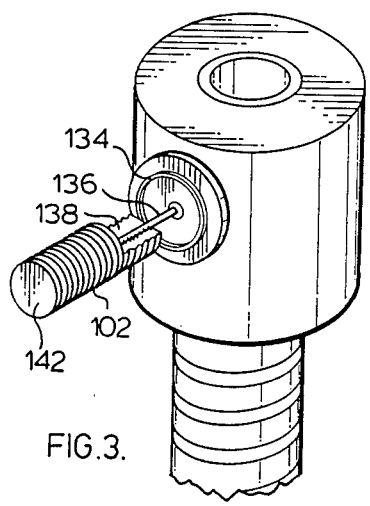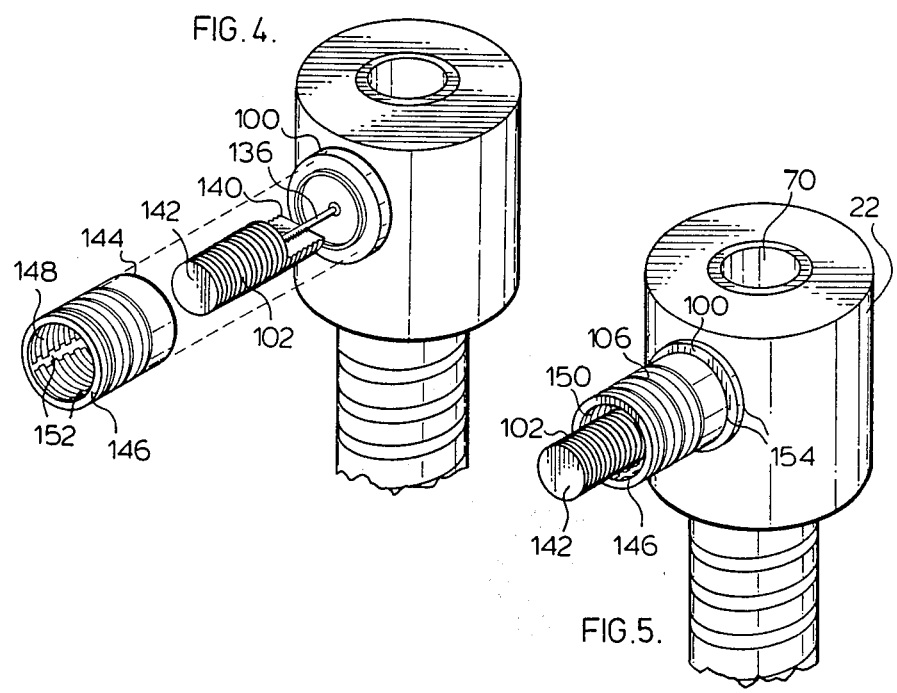

METHOD OF MANUFACTURE OF INJECTION MOLDING NOZZLE ELECTRICAL TERMINAL

BACKGROUND OF THE INVENTION

This invention relates to a method of making an injection molding nozzle with an improved terminal for the electric heating element.

Nozzles with integral heating elements are well known in the art. For example, the applicant's Canadian patent application Ser. No. 542,185 entitled "Coated Injection Molding Nozzle and Method" filed July 15, 1987 and U.S. application Ser. No. 086,621, filed Aug. 18, 1987 disclose a nozzle in which the forward end of the heating element extends into the nose portion. The applicant's Canadian patent application Ser. Nos. 549,518 entitled "Injection Molding Nozzle Having Grounded Heating Element Brazed into Pointed Tip" and 549,517 entitled "Method of Manufacture of Injection Molding Nozzle Having Grounded Heating Element Brazed into Pointed Tip" both filed Oct. 16, 1987 disclose further improvements. The electrical heating element normally has a resistance wire extending centrally through an electrical insulating material such as magnesium oxide inside a steel casing. As is well known, it is necessary to connect the resistance wire at the rear end or ends of the heating element to a larger diameter conductor to form a "cold terminal" to which an external electrical lead is connected. In instances where the heating element is cast or brazed in place it may also be necessary to seal against leakage of the brazing material.

In the past, a variety of different structures have been used to provide the electrical terminal. For instance, the applicant's U.S. Pat. Nos. 4,403,405 entitled "Sprue Bushing Connector Assembly Method" which issued Sept. 13, 1983 and 4,446,360 (divisional) entitled "Sprue Bushing Connector Assembly" which issued May 1, 1984 disclose connectors using crimping sleeves and sealing using a split washer arrangement. Other arrangements using sleeves are shown in the applicant's U.S. Pat. Nos. 4,557,685 entitled "Heated Nozzle for Injection Molding Apparatus" which issued Dec. 10, 1985 and 4,583,284 (divisional) entitled "Method of Manufacture of Injection Molding Heated Nozzle with Brazed in Heating Element" which issued Apr. 22, 1986, as well as in the applicant's Canadian patent application Ser. No. 532,677 entitled "Injection Molding Nozzle and Method" which was filed Mar. 20, 1987. However, all of these prior art heating element terminals have the disadvantages that they are made complete prior to assembly and relatively difficult to adjust to the right overall length consistently for uniform temperature control when in operation.

SUMMARY OF THE INVENTION

Accordingly, it is an object of the present invention to at least partially overcome the disadvantages of the prior art by providing an economical method of making an improved integral injection molding nozzle which secures the rear end of the heating element and the stud to which it is connected firmly in place.

To this end, in one of its aspects, the invention provides a method of making an integral injection molding nozzle to be seated in a well in a cavity plate having an inner surface, the nozzle having a main body and a forward end and a rear end, the nozzle having a steel central portion with a generally cylindrical outer surface extending between a steel collar portion adjacent the rear end and a steel nose portion adjacent the forward end, the nozzle having a melt bore with first and second portions, the first portion extending centrally from the rear end through the central portion and joining the second portion which extends through the nose portion, the nozzle having an electrically insulated heating element with a resistance wire extending centrally through an electrical insulating material in an outer casing, the heating element having a rear end extending out through a radial opening in the collar portion to a cold terminal, the method including the step of integrally vacuum brazing the nozzle together with a portion of an electrical heating element in a spiral channel extending around the cylindrical outer surface of the central portion, the improvement including forming a plug having a front surface, an outer surface and a heating element bore extending therethrough, seating the plug in the radial opening in the collar portion by inserting the rear end of the heating element into the bore and sliding the plug to a position where it is seated in the radial opening with the rear end of the heating element projecting at least a predetermined minimum distance from the front face of the plug, stripping the outer casing and the insulating material from the resistance wire adjacent the rear end of the heating element to provide an exposed portion of resistance wire, forming an electrically conductive stud which is considerably larger in diameter than the resistance wire, the stud having an inner end, an outer end, and an outer surface which is threaded adjacent the outer end, connecting the inner end of the stud to the exposed portion of the resistance wire, forming a sleeve with an inner surface which is considerably larger in diameter than the stud, the sleeve having an inner end and an outer end, mounting the sleeve over the stud in a position wherein the inner end contacts the plug and the outer end of the stud projects centrally a predetermined distance past the outer end of the sleeve, thereby forming a space extending circumferentially between the stud and the surrounding sleeve, applying brazing material around the outer surface of the plug and the inner end of the sleeve and heating them in a vacuum furnace during the vacuum brazing step whereby the plug is integrally brazed in the radial opening in the collar portion and the sleeve is integrally fixed to the plug, and holding the nozzle in a position wherein the outer end of the stud extends upright and pouring liquid insulating material to fill the space between the stud and the surrounding sleeve, whereby when the insulating material hardens the stud is held securely in position with the threaded outer surface adjacent the outer end projecting a predetermined distance from the insulating material to receive an electrical lead.

Further objects and advantages of the invention will appear from the following description, taken together with the accompanying drawings.

BRIEF DESCRIPTION OF THE DRAWINGS

FIGS. 2-7 illustrate the sequence of steps involved in providing the nozzle with the terminal according to the preferred embodiment of the invention.

DETAILED DESCRIPTION OF THE DRAWINGS

Figure 1:
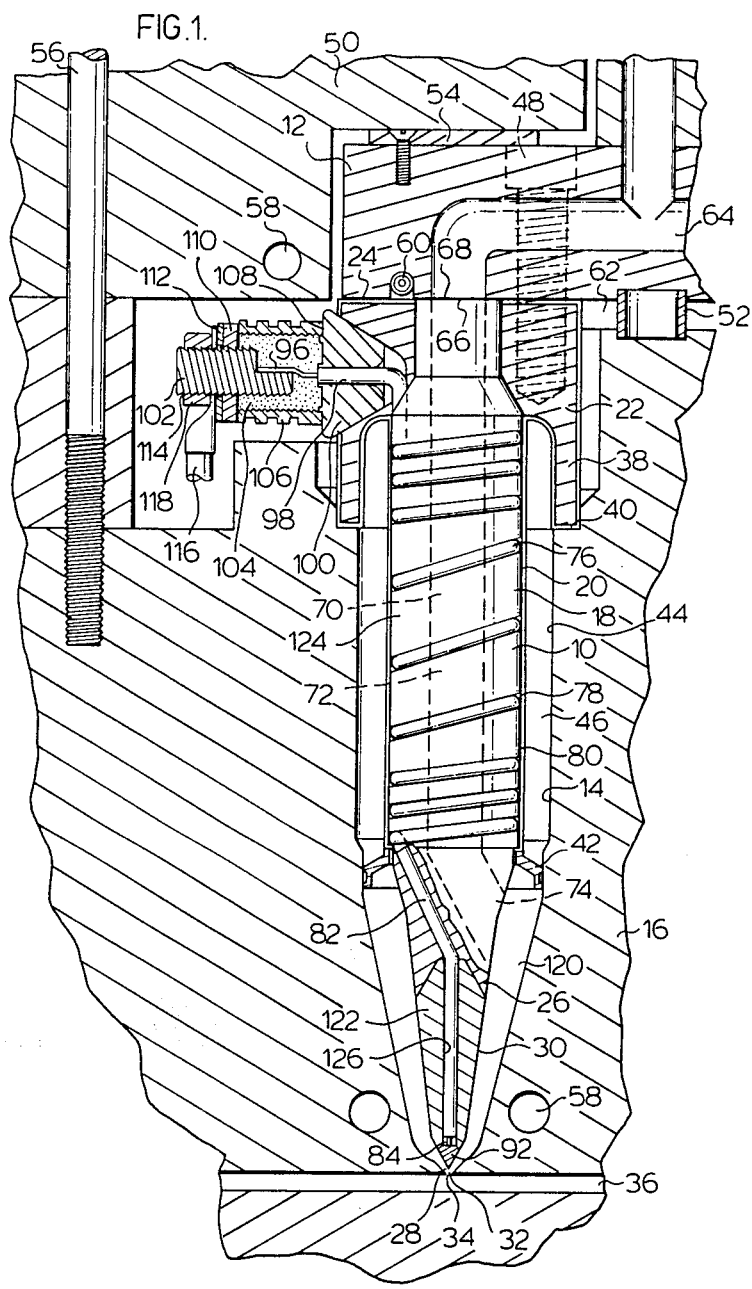
FIG. 1 is a sectional view of a portion of a multi-cavity injection molding system, showing a nozzle having an electrical terminal made according to a preferred embodiment of the invention.
Figure 6:
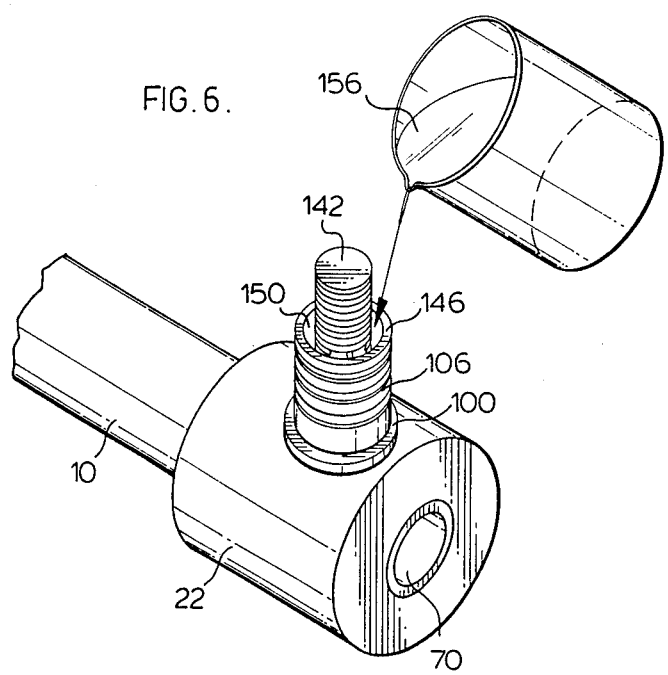
Figure 7:
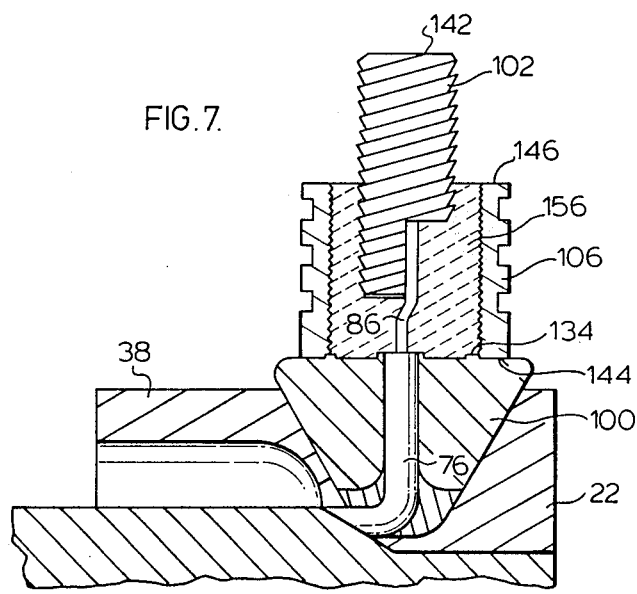

Reference is first made to FIG. 1 which shows the installation of a heated nozzle 10 having an electrical terminal made according to the invention in a multicavity injection molding system. In this system, a number of aligned heated nozzles 10 extend from a common elongated heated manifold 12. Each heated nozzle 10 is seated in a well 14 in a cavity plate 16. The nozzle 10 has a steel central portion 18 with a generally cylindrical outer surface 20 extending between a steel collar portion 22 adjacent the rear end 24 and a steel elongated nose portion 26 adjacent the forward end 28. The nose portion 26 has a tapered outer surface 30 which leads to a pointed tip 32 at the forward end 28 which is in alignment with a gate 34 in the cavity plate 16 leading to a cavity 36.

The nozzle 10 is seated in this position in the well 14 by a circumferential insulation flange or bushing 38 which extends from the collar portion 22 and sits on a circumferential shoulder 40. The nozzle is accurately located with the pointed tip 32 in alignment with the gate 34 by a circumferential sealing and locating flange 42 which extends between the central portion 18 and the nose portion 26 to abut against the inner surface 44 of the well 14. As can be seen, other than the insulation flange 38 and the sealing and locating flange 42, the heated nozzle 10 is separated from the surrounding cooled cavity plate 16 by an insulative air space 46.

Each nozzle 10 is fastened by bolts 48 to the manifold 12 which is secured between the cavity plate 16 and a top clamp plate 50 by a locating ring 52 and a titanium pressure pad 54. The top clamp plate 50 is held in place by bolts 56 which extend into the cavity plate 16. The top clamp plate 50 and the cavity plate 16 are cooled by pumping cooling water through cooling conduits 58. The manifold 12 is heated by an electric heating element 60 which is cast into it as described in the applicant's U.S. Pat. No. 4,688,622 entitled "Injection Molding Manifold Member and Method of Manufacture" which issued Aug. 25, 1987. The locating ring 52 provides another insulative air space 62 between the heated manifold 12 and the cooled cavity plate 16.

The manifold 12 has a melt passage 64 which branches from a common inlet to a number of outlets 66 on the opposite side. Each outlet is in alignment with an inlet 68 to a melt bore 70 extending through one of the nozzles. Each melt bore 70 has a central portion 72 extending from the rear end 24 and a diagonal portion 74, which connects to the tapered surface 30 of the nose portion 26.

The nozzle 10 is heated by an electrically insulated heating element 76 which is integrally brazed in a spiral channel 78 in the cylindrical outer surface 20 of the central portion 18. The heating element 76 in the channel 78 and the outer surface 20 are covered with a protective nickel coating 80 as described in the applicant's Canadian patent application Ser. No. 542,185, mentioned above. The heating element 76 also has a portion 82 which extends diagonally into the nose portion 26 of the nozzle 10 beneath the circumferential sealing and locating flange 42 and then centrally to a forward end 84 adjacent the pointed tip 32. As clearly seen in FIG. 2, the low voltage single wire heating element 76 has a nickel-chrome resistance wire 86 extending centrally through a refractory powder electrical insulating material 88 such as magnesium oxide inside a steel casing 90.

At the forward end 84 of the heating element 76, the exposed resistance wire 86 projects from the insulating material 88 and casing 90 to a high speed steel insert portion 92 which forms the pointed tip 32. The exposed wire 86 and the high speed steel insert portion 92 are integrally brazed in nickel which grounds the heating element 76 adjacent the pointed tip. This provides a pointed tip 32 which is corrosion and wear resistant and which can be heated by the heating element 76 to a predetermined temperature. As described in more detail below, the heating element 76 has a rear end 96 which extends out through a central bore 98 in a plug 100 received in the collar portion 22. The resistance wire 86 at the rear end 96 of the heating element 76 connects to a threaded stud 102 and they are held securely in place by surrounding ceramic insulation 104 which extends inside a cylindrical steel sleeve 106 attached to the surface 108 of the plug 100. A ceramic washer 110 and a steel washer 112 are received on the projecting stud 102 to form a cold terminal 114 which receives an external power lead 116 which is held securely in place by nut 118. Thus, electrical current from the lead 116 flows through the heating element 76 to the ground at the forward end 84. This heats the nozzle 10 throughout both the central portion 18 and the nose portion 26 so that the pointed tip 32 can be heated to a predetermined temperature. The nozzle 10 has a thermocouple hole (not shown) which is drilled diagonally from the outer surface 20 of the central portion 18 to extend beneath the sealing and locating flange 42. In use, the thermocouple hole removably receives a thermocouple which extends through the air space 46 to measure the operating temperature.

In use, after the injection molding system has been assembled as shown in FIG. 1 and described above, electrical power is applied through the lead 116 to the heating element 76 in each nozzle 10 and to the heating element 76 in the manifold 12 to heat the nozzle 10 and the manifold to a predetermined operating temperature. Pressurized melt from a molding machine (not shown) is then introduced into the melt passage 64 in the manifold 12 according to a predetermined cycle in a conventional manner. The pressurized melt flows through the melt bore 70 in each nozzle 10 into the space 120 surrounding the tapered surface 30 of the nose portion 26, and then through the gate 34 and fills the cavity 36. The space 120 remains filled with plastic a portion of which solidifies adjacent the cooled cavity plate 16, and the sealing and locating flange 42 prevents it escaping into the insulative air space 46. After the cavities are filled, injection pressure is held momentarily to pack and then released. After a short cooling period, the mold is opened to eject the molded products. After ejection, the mold is closed and injection pressure is reapplied to refill the cavity. This cycle is repeated continuously with a frequency dependent on the size and shape of the cavities and the type of material being molded.

As described in detail in the applicant's Canadian patent application Ser. No. 549,517 entitled "Method of Manufacture of Injection Molding Nozzle Having Grounded Heating Element Brazed into Pointed Tip" the nozzle is made by integrally brazing the collar portion 22 and a high speed steel tip portion 122 to a steel main body 124. They are assembled by tack welding them in place with a portion of the heating element 76 wound in the spiral channel 78. Nickel brazing paste is applied to the joints and the assembly is sprayed with a binder such as acrylic lacquer and then dipped in agitated metallic powder such as nickel or an alloy thereof to coat the surfaces. The high speed steel insert 92 is placed with some nickel alloy brazing powder in the heating element bore 126 extending centrally through the tip portion 122. The assembly is then heated in a vacuum furnace to a temperature of approximately 1925° F. and the furnace is evacuated to a relatively high vacuum to remove substantially all the oxygen. When the coating is heated, the binder is volatized, but the nickel alloy remains in place. Before the melting temperature of the nickel alloy is reached, the vacuum is reduced by partially backfilling with an inert gas such as argon or nitrogen. When the nickel alloy melts, it flows by capillary action to integrally braze the assembly together, provide a protective nickel coating on the surfaces, and ground the exposed wire 86 at the forward end 84 of the heating element 76. While the nozzle is preferably made by the method described above, it may also be made by the vacuum brazing or casting methods described by the applicant in U.S. Pat. Nos. 4,557,685 entitled "Heated Nozzle for Injection Molding Apparatus" which issued Dec. 10, 1985 and 4,583,284 (divisional) entitled "Method of Manufacture of Injection Molding Nozzle with Brazed in Heating Element" and Canadian patent application Ser. No. 532,677 filed Mar. 20, 1987 entitled "Injection Molding Nozzle and Method". Whichever brazing method of making the nozzle is used, the present invention includes the additional steps to make the nozzle with an integral electrical cold terminal 114 as described below.

Reference is now made to FIGS. 2-7 which illustrate the additional steps involved in providing the nozzle 10 with the cold terminal 114 according to the preferred embodiment of the invention. A plug 100 is made of steel with the heating element bore 98 extending centrally therethrough from the front surface 108. The plug 100 is made with a tapered outer surface 128 which matches the tapered surface 130 of a radial opening 132 in the collar portion 22. The front surface 108 of the plug 100 has a circular flange 134 which projects forwardly to receive the sleeve 106 as described below. As shown in FIGS. 2 and 3, the plug 100 is seated in the radial opening 132 in the collar portion by inserting the rear end 96 of the heating element 76 into the heating element bore 98 through the plug and sliding the plug into position. This further bends the heating element 76 and leaves the rear end 96 of the heating element projecting out past the front surface 108 of the plug. The plug 100 is tack welded in this position with the tapered outer surface 128 of the plug abutting against the matching tapered surface 130 of the radial opening 132 in the collar portion 22.

If necessary, the heating element 76 is then cut off to have the rear end 96 extend a predetermined distance out from the front surface 108 of the plug 100. As seen in FIG. 2, the outer casing 90 and insulation 88 are then stripped adjacent the rear end 96 of the heating element 76 to leave an exposed portion 136 of the resistance wire 86. The exposed portion 136 of the resistance wire 86 is welded to a flat surface 138 extending from an inner end 140 of the stud 102. The stud 102 is made of steel and is threaded. The conductive stud is made considerably larger in diameter than the wire 86 so that its resistance is quite low and it does not heat up from the current flowing through it during use.

As seen in FIGS. 4 and 5, a cylindrical sleeve 106 is then mounted over the projecting stud 102 with its inner end 144 which abuts against the front surface 108 of the plug fitting over the circular flange 134 to locate it. The sleeve 106 is tack welded to hold it in the position in which the threaded outer end 142 of the stud 102 projects a predetermined distance out past the outer end 146 of the sleeve 106. The sleeve 106 is made of steel and has an inner surface 148 which is considerably larger in diameter than the stud 102 to provide a space 150 which extends circumferentially between them. The inner surface 148 of the sleeve is threaded and broached to form several longitudinal grooves 152.

Beads 154 of nickel brazing paste are run around the outer surface 128 of the plug 100 and the inner end 144 of the sleeve 106 and the assembly is then heated in a vacuum furnace in the brazing step described above. In addition to providing the protective nickel coating on the surfaces, this melts the brazing paste 154 which flows by capillary action to integrally braze the plug 100 and the sleeve 106 together with the other components of the assembly.

After removal from the vacuum furnace, the nozzle is machined to provide the pointed tip 32 as described in the applicant's Canadian patent application Ser. No. 549,517 filed Oct. 16, 1987 entitled "Method of Manufacture of Injection Molding Nozzle Having Grounded Heating Element Brazed into Pointed Tip" referred to above. The nozzle is then held in a position with the outer end 142 of the stud 102 upright and liquid chemically bonded insulating material 156 is poured in to fill the space 150 between the stud 102 and the surrounding sleeve 106. In the preferred embodiment, this material is THERMOPLAST HBK 1500 which is a Trade Mark of Reichelt Chemietechnik for a ceramic insulating material. However, other insulating materials having suitable electrical and mechanical properties can be used. After pouring, the liquid insulating material 156 is vibrated to ensure it fills the threads and grooves 152 on the inner surface 148 of the sleeve 106. As can clearly be seen in FIG. 7, after the insulating material hardens, it holds the rear end 96 of the heating element 76 and the stud 102 securely in position. The ceramic material 156 bonds to the threads on the stud 102 and on the inner surface 148 of the sleeve 106 to secure the stud against axial as well as lateral forces applied to it. Similarly, the ceramic material bonds in the longitudinal grooves 152 in the inner surface 148 of the sleeve 106 and against the flat surface 138 of the stud 102 to secure the stud against torque. Thus, this considerably reduces the danger of forces applied to the stud 102 flexing the resistance wire 86 and eventually breaking it off. As shown in FIG. 1, a ceramic insulating washer 110 and a steel washer 112 are then mounted on the outer end of the stud prior to receiving the electrical lead 116 which is held in place by nut 118. As described above, the torque applied to tighten the nut 118 in place is taken up by the ceramic material 156 and not transferred to the relatively frail resistance wire 86.

While the description of the steps involved in providing the nozzle with an improved electrical terminal has been given with respect to a preferred embodiment, it is not to be construed in a limiting sense. Variations and modifications will occur to those skilled in the art. For instance, the plug 100, the stud 102 and the sleeve 106 can have different configurations than those shown. In some applications, the sleeve 106 can be made of a heat resistant plastic material which eliminates the requirement for ceramic insulation washer 110. Reference is made to the appended claims for a definition of the invention.

What we claim is:

1. In a method of making an integral injection molding nozzle to be seated in a well in a cavity plate having an inner surface, the nozzle having a main body and a forward end and a rear end, the nozzle having a steel central portion with a generally cylindrical outer surface extending between a steel collar portion adjacent the rear end and a steel nose portion adjacent the forward end, the nozzle having a melt bore with first and second portions, the first portion extending centrally from the rear end through the central portion and joining the second portion which extends through the nose portion, the nozzle having an electrically insulated heating element with a resistance wire extending centrally through an electrical insulating material in an outer casing, the heating element having a rear end extending out through a radial opening in the collar portion to a cold terminal, the method including the step of integrally vacuum brazing the nozzle together with a portion of an electrical heating element in a spiral channel extending around the cylindrical outer surface of the central portion, the improvement including (a) forming a plug having a front surface, an outer surface and a heating element bore extending therethrough, (b) seating the plug in the radial opening in the collar portion by inserting the rear end of the heating element into the bore and sliding the plug to a position where it is seated in the radial opening with the rear end of the heating element projecting at least a predetermined minimum distance from the front face of the plug, (c) stripping the outer casing and the insulating material from the resistance wire adjacent the rear end of the heating element to provide an exposed portion of resistance wire, (d) forming an electrically conductive stud which is considerably larger in diameter than the resistance wire, the stud having an inner end, an outer end, and an outer surface which is threaded adjacent the outer end, (e) connecting the inner end of the stud to the exposed portion of the resistance wire, (f) forming a sleeve with an inner surface which is considerably larger in diameter than the stud, the sleeve having an inner end and an outer end, (g) mounting the sleeve over the stud in a position wherein the inner end contacts the plug and the outer end of the stud projects centrally a predetermined distance past the outer end of the sleeve, thereby forming a space extending circumferentially between the stud and the surrounding sleeve, (h) applying brazing material around the outer surface of the plug and the inner end of the sleeve and heating them in a vacuum furnace during the vacuum brazing step whereby the plug is integrally brazed in the radial opening in the collar portion and the sleeve is integrally fixed to the plug, and (i) holding the nozzle in a position wherein the outer end of the stud extends upright and pouring liquid insulating material to fill the space between the stud and the surrounding sleeve, whereby when the insulating material hardens the stud is held securely in position with the threaded outer surface adjacent the outer end projecting a predetermined distance from the insulating material to receive an electrical lead.

2. A method as claimed in claim 1 including mounting an insulation washer over the projecting outer end of the stud prior to receiving the electrical lead which is secured in place by screwing a nut on the projecting outer end.

3. A method as claimed in claim 2 including forming the stud with a flat surface extending from the inner end and welding the exposed portion of the resistance wire to the flat surface.

4. A method as claimed in claim 3 including tack welding the plug and the sleeve in position prior to brazing.

5. A method as claimed in claim 4 including threading the inner surface of the sleeve.

6. A method as claimed in claim 5 including broaching the inner surface of the sleeve.

7. A method as claimed in claim 6 including cutting off the heating element after the plug is mounted in place to provide the rear end of the heating element a predetermined distance from the front face of the plug.

8. A method as claimed in claim 7 including vibrating the molten ceramic.

9. A method as claimed in claim 8 including making the plug with a circular flange projecting from the front face to receive the inner end of the sleeve.

10. A method as claimed in claim 9 including making the outer surface of the plug tapered to abut against a matching tapered surface of the radial opening in the collar portion.

11. A method as claimed in claim 10, wherein the insulating material is THERMOPLAST HBK 1500 ceramic.

* * * * *